United States Patent [19]

Hall et al.

[11] Patent Number: 5,425,615

[45] Date of Patent: Jun. 20, 1995

[54] COMBINATION FOLDING STAIR AND PLATFORM WHEELCHAIR LIFT

[75] Inventors: John C. Hall, Hayward; Lee B. Petersen, Jr., Castro Valley, both of Calif.

[73] Assignee: All American Transit Parts, Oakland, Calif.

[21] Appl. No.: 316,543

[22] Filed: Sep. 30, 1994

[51] Int. Cl.⁶ .............................................. B60R 3/02
[52] U.S. Cl. .................... 414/545; 414/541; 414/921; 105/447; 280/166
[58] Field of Search ................ 280/166; 105/447, 448; 414/540, 541, 545, 921

[56] References Cited

U.S. PATENT DOCUMENTS

| Re. 33,495 | 5/1991 | Thorley et al. | |
|---|---|---|---|
| 3,913,497 | 10/1975 | Maroshick | 105/447 |
| 4,027,807 | 6/1977 | Thorley . | |
| 4,081,091 | 3/1978 | Thorley . | |
| 4,124,096 | 11/1978 | Dudynskyj et al. | 280/166 |
| 4,164,292 | 8/1979 | Karkau | 414/545 |
| 4,176,999 | 12/1979 | Thorley . | |
| 4,251,179 | 2/1981 | Thorley . | |
| 4,270,630 | 6/1981 | Karkau | 414/545 |
| 4,441,850 | 4/1984 | Thorley . | |
| 4,466,771 | 8/1984 | Thorley et al. . | |
| 4,556,128 | 12/1985 | Thorley et al. . | |
| 5,224,723 | 7/1993 | Hatas | 414/541 |
| 5,316,432 | 5/1994 | Smalley et al. | 280/166 |

OTHER PUBLICATIONS

Denver RTD Contract Specification.
Eskridge Multiple Disc Failsafe Brakes brochure, no date.

Primary Examiner—Michael S. Huppert
Assistant Examiner—Thomas J. Brahar
Attorney, Agent, or Firm—Bruce & McCoy

[57] ABSTRACT

A combination folding stair and platform wheelchair lift which translates from one configuration to the other depending upon the purpose to be served utilizing a series of panels which form a flat platform or alternatively steps and risers and which reciprocate horizontally on a pair of side rails and which are raised and lowered vertically in a pair of side column frames by a pair of hydraulically driven endless chains.

7 Claims, 6 Drawing Sheets

COMBINATION FOLDING STAIR AND PLATFORM WHEELCHAIR LIFT

CROSS-REFERENCE TO RELATED APPLICATION

The present invention is related to U.S. patent application Ser. No. 08/198,227 filed Feb. 18, 1994 for Safety Barrier Ramp Actuating Mechanism for Wheelchair Lifts by John C. Hall and Lee B. Petersen, Jr.

BACKGROUND OF THE INVENTION

1. Field of the Invention

The present invention relates to wheelchair lifts or elevators and, more particularly, to combination stair and folding platform wheelchair lifts which translate from one configuration to the other depending upon the purpose to be served. Still more particularly, the present invention relates to an improved operating design and actuating mechanism for such a lift.

2. Description of the Prior Art

The art of combination folding stair and platform wheelchair lifts, which translate from one configuration to the other depending upon the purpose to be served, is well-developed.

A relatively early example which illustrates the presently generally accepted concept of wheelchair lifts like the present invention is disclosed in U.S. patent Ser. No. 4,027,807 for a Wheelchair Lift, issued Jun. 7, 1977, to Graham R. Thorley. Thereshown is an elevator or lift for a wheelchair, or physically impaired person, which is particularly adapted to replace the entrance/exit stairs of a public transportation vehicle such as a bus, trolley, or light rail train car. The Thorley '807 patent discloses a set of stairs having step and riser panels which transform into a horizontal lift platform to operate as an elevator. The outer or end panel of the platform in some designs serves both as a ramp at the end of the platform and as a safety barrier, when it flips upward from the end of the platform, to prevent a wheelchair from rolling off the end thereof during vertical motion of the platform. An improved design for such a barrier is disclosed in applicants' related application.

Wheelchair lifts are presently made in the convertible stair/platform configuration for a specific purpose which is to be installed or retrofitted into the door system of a large multi-passenger vehicle to permit wheelchair users to have access to public transportation as mandated by federal regulations. The wheelchair lift collapses into a stair configuration within the door system of a vehicle to permit use by frilly mobile persons. However, once the doors are open, the stair configuration can be transformed first into a platform by collapsing the stair panels into a horizontal array which projects outward from the bus so that it extends beyond the side thereof for a sufficient distance to extend over a curb. The stairs, upon flattening, are typically disposed, in the prior art designs, at bus floor level which permits a wheelchair-bound or physically-impaired person inside the bus to roll or step onto the platform and then be lowered to the ground. Alternatively, upon extension, the platform can be lowered either to ground or curb level to permit a wheelchair or physically impaired person to be rolled or step thereon and then lifted to bus floor level for movement into the bus. The bus driver/wheelchair lift operator thereafter transforms the lift back into a stair configuration and the doors are closed.

Once the platform has been raised to bus floor level and the wheelchair moved into the bus, the rift operator selects the step configuration control. The barrier/ramp panel then usually retracts inward around the outboard end of the platform to lie flat on top of the outer panel of the platform during the transformation of the lift from platform to stair configuration at which time the barrier/ramp then serves the function as the tread of the bottom step of the stair configuration of the wheelchair lift.

These designs of the prior art include many operating problems because of the complex mechanisms and procedural operations required to sequentially convert the elevator between the stairs and platform configurations. More importantly, some have specific deficiencies which are capable of causing injury to passengers when there is a malfunction or when they are operated incorrectly. The present invention overcomes these problems and provides new and improved operating methods and actuating mechanisms for transforming the combination folding stair and platform wheelchair lifts between the two configurations and for operation of the lift in the elevator functioning mode.

SUMMARY OF THE INVENTION

The present invention is a combination folding stair and platform wheelchair lift which translates from one configuration to the other depending upon the purpose to be served. It is comprised of a pair of interacting frameworks. The first includes a pair of vertically disposed parallel column frames secured to the structure in which the wheelchair lift is mounted. The second framework includes a pair of horizontally disposed parallel platform support rails having inboard and outboard ends. The rails are interconnected by the second framework and have a pair of slides which are slidably engaged with the column frames and reciprocate vertically with respect thereto. A multiple of interconnected folding panels are provided forming alternately a platform or a series of steps having a lower, intermediate, and top step with risers disposed therebetween. The folding panels are interconnected by horizontal, parallel axis, hinges, and they are mounted in a moveable carriage frame having a pair of wheels secured thereto on opposite sides thereof and which ride on tracks mounted on the platform support rails. The top panel of the array has guide means secured thereto which reciprocate in guide tracks disposed in the column frames as the panels articulate between steps and platform configurations. A pair of first support arms are pivoted at their lower ends to the platform support rails and at their upper ends to the top step panel whereby the panel is disposed horizontal when said panel is arranged in either step or platform configuration. Two pairs of second support arms are secured to the flamework and to the folding panel forming the intermediate step of the folding stair array. The second support arms form two sides of a four-bar linkage whereby when the intermediate step panel is in either the platform or step configuration, that panel is disposed horizontally. A drive means is provided for reciprocating the second support arms between the horizontal and vertical positions which changes the configuration of the folding panel array between the platform and steps configuration. A hoist means is provided for raising and lowering the slides when the panel array is disposed on the support rails in the platform configuration.

OBJECTS OF THE INVENTION

It is therefore an important object of the present invention to provide an improved apparatus and method of operation for a combination folding stair and platform wheelchair lift which translates from one configuration to the other.

It is another object of the present invention to provide an improved wheelchair lift that translates from one configuration to the other more efficiently, smoothly, safely, and reliably than prior art devices.

It is a further object of the present invention to provide an improved wheelchair lift that includes a fall-safe safety brake.

And it is yet a further object of the present invention to provide an actuating mechanism for a combination stair and wheelchair lift which functions more efficiently, smoothly, safely, and reliably in the elevator functioning mode.

Other objects and advantages of the present invention will become apparent when the design and apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

The combination folding stair and platform wheelchair lift of the present invention is comprised essentially of two interacting frameworks, the second of which reciprocates vertically within the first, and a sliding set of panels which converts between the stair and platform configurations on top of the second framework. A pair of vertically disposed parallel column frames 11 are secured to the first framework which in turn is secured to the structure in which the wheelchair lift is mounted. These column frames include recessed tracks for a pair of endless chain drives 13 which have idler sprockets 15 mounted at the top ends thereof and around which the drive chains are tracked.

The column frames 11 also include two pairs of recessed tracks for two pairs of sliding guide members which reciprocate up and down in the column frames as part of a pair of two separate guide means. One of the pairs of tracks is part of a first guide means for guiding the first framework in its vertical motion on the column frames and the other pair of tracks is for a second guide means for guiding the stair step panel array in its vertical motion during transformation between steps and platform. A handrail 19 is secured to the top of each of the column frames for use by unimpaired persons during boarding and offloading the vehicle in which the elevator is secured and when it is in the stair configuration.

The second framework supports a pair of horizontally disposed parallel platform support rails 21, having inboard and outboard ends 23, 25 respectively, and which are mounted between the column frames 11. The platform support rails are interconnected by the second framework crosspiece tie bars and have a pair of slides 17 which are respectively slidably engaged with the column frames and reciprocate vertically with respect thereto as part of the first guide means. When the slides move up or down in the column frames in an elevator function, the support rails which are secured thereto do likewise.

The slides 17 of the first guide means are elongated and secured perpendicularly and rigidly to the platform support rails 21. The length of the slides permits an extended engagement in the tracks of the first guide means in the column frames so that the platform configuration of the elevator is stabilized irrespective of the loading longitudinally thereof and during raising and lowering of the elevator.

A multiple interconnected folding panel array forming alternately a platform or a series of steps is mounted between the column frames on the platform support rails. The panels include at least a lower 27, intermediate 29, and top step 31 with risers 33, 35 disposed therebetween. An additional barrier panel can be hinged to the lower step as described in the aforementioned related application. The top step is relatively narrow lengthwise and, when the array is arranged in steps configuration, it is disposed at vehicle floor level even therewith. The folding panels are interconnected by horizontal, parallel axis, hinges 37 and are connected to a movable carriage frame 39 having a pair of wheels 41 secured thereto on opposite sides thereof which ride on the platform support rails.

Side panels A and B are secured to the carriage frame and serve as side barriers for the elevator. One of the side panels B is secured to the top riser panel 35 of the array while the other side panel A is secured to the carriage frame. The first two panels nest when the array is in steps configuration and stand alone when the array flattens out into the platform configuration to serve as side barriers.

Figure 7:
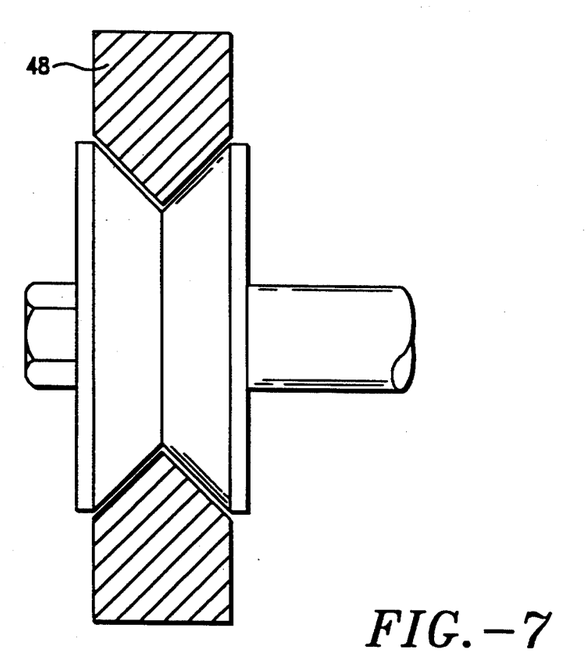
FIG. 7 is an end elevation of a broken out view of the dual V-tracking roller system for panel array in column frames secured to the platform support rails.
Figure 8:
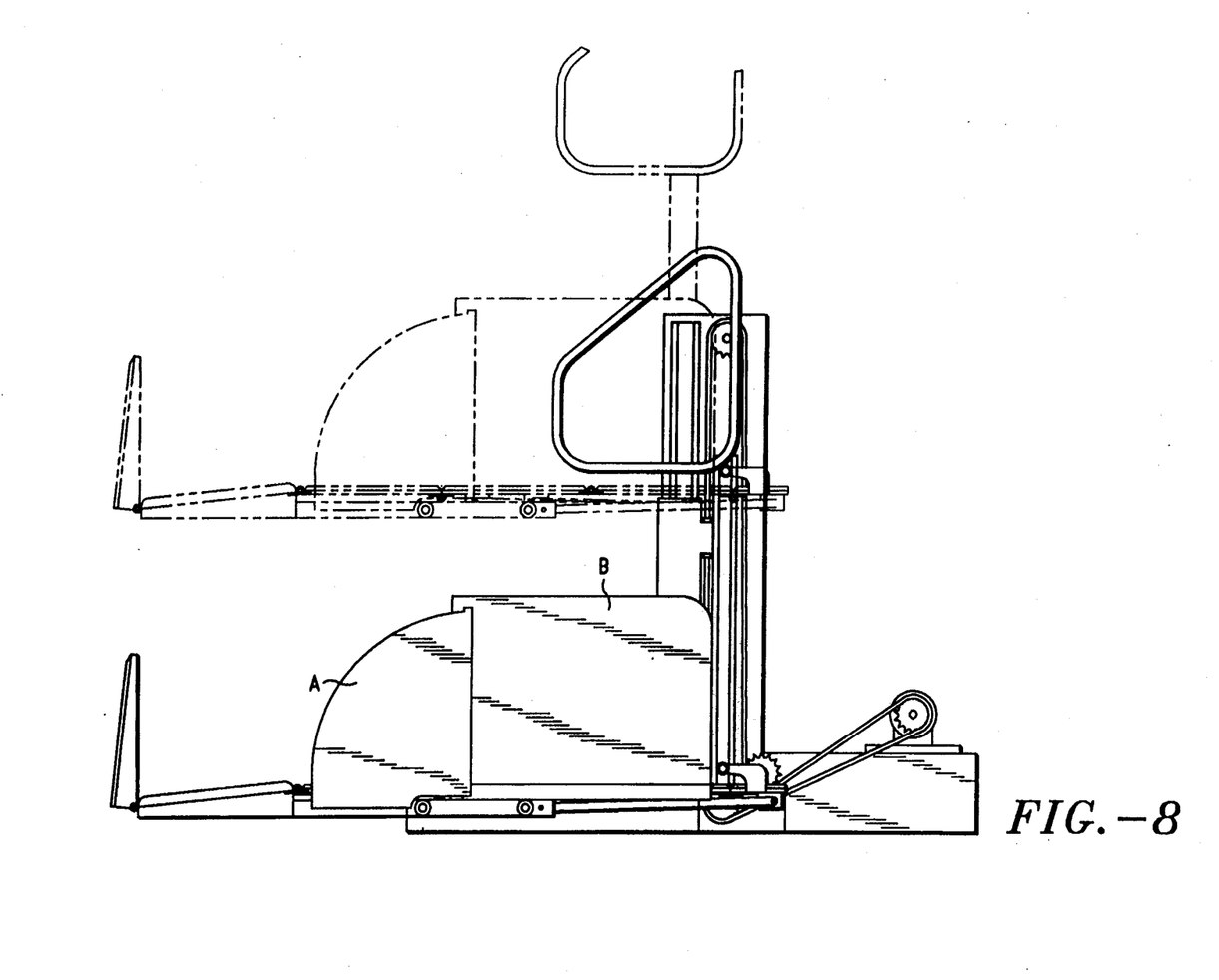
FIG. 8 is a side elevation of the assembled invention in the platform configuration showing the side barrier panels.

The first guide means in the column frames, and the platform support rails for the slide on the second framework for the movable carriage frame for the folding panels, include dual V tracking ball-bearing grooved wheels for precise and even movement along the support rails during the transformation between steps or platform configurations and along the column frames during the raising and lowering of the platform. The dual V tracking includes wheels which have a V-shaped groove in the circular periphery thereof while the tracks for the wheels include knife or V-shaped edge:

opposed rails which trap the wheels therebetween for positive engagement of the wheels between the rails.

The panel 31 forming the top step of the stair configuration of the panel array has a pair of male guide members 43 which are secured thereto and which reciprocate in the other pair of recessed vertical tracks of the second guide means disposed in the column frames. The male members of the second guide means reciprocate vertically in the second pair of guide tracks as the panels articulate between steps and platform configuration. The male members of this slide means include roller guide wheels captured in a pair of channel tracks 45 for collapsing the platform vertically into steps configuration or the reverse.

A pair of first support arms 47 are pivoted at the lower ends to the platform support rails 21 and are pivoted at their upper ends to the top step panel 31. As a result, the panel is disposed level when the panel is either in the top step or platform configuration due to the positioning of the support arms. The upper ends of the support arms are pivoted to blocks secured to the bottom surface of the panel forming the top step.

Two pairs of second support arms 49, 51 are pivotally secured at their lower ends to the second framework and are pivotally secured at their upper ends to the folding panel 29 forming the intermediate step of the folding stair configuration. The upper ends of the support arms are pivoted to blocks secured to the bottom surface of the panel forming the intermediate step. The second pairs of support arms form two sides of a parallelogram or four-bar linkage whereby when the intermediate step panel is in either the platform or step configuration, the panel is disposed horizontally. The other elements of the four-bar linkage are the step and the second framework which supports the lower pivoted ends of the arms.

A drive means is provided for reciprocating the support arms 49, 51 between the horizontal and vertical positions which changes the configuration of the folding panel array between the platform and steps configuration. In the preferred mechanism, the drive means is a hydraulic cylinder 53 which is secured between the framework and a pair of the support arms. Hydraulic actuation is most easily accomplished and integrated to the remainder of the power requirements.

In a preferred arrangement of second support arm layout in top plan view, the pair of support arms 49 secured at the outboard end of the intermediate step 29 are disposed relatively close together in the middle of the step to support the weight of persons boarding and leaving the bus. The two inboard support arms 51 are spaced further apart to help support the whole weight of the panel array. The close spacing of the two front arms permits a cross-arm to be erected therebetween to which a single hydraulic cylinder 53 may be secured for raising and lowering the whole panel array from platform to steps and return.

A hoist means is provided for raising and lowering the slides 17 of the second framework in the column frames 11 of the first framework when the panel array is disposed in the second framework in the platform configuration. The hoist means includes the pair of endless drive chains 13 mounted in the column frames and driven by a hydraulic motor 55. The drive chains are secured to the slides which are secured to the platform support rails 21.

Figure 1:
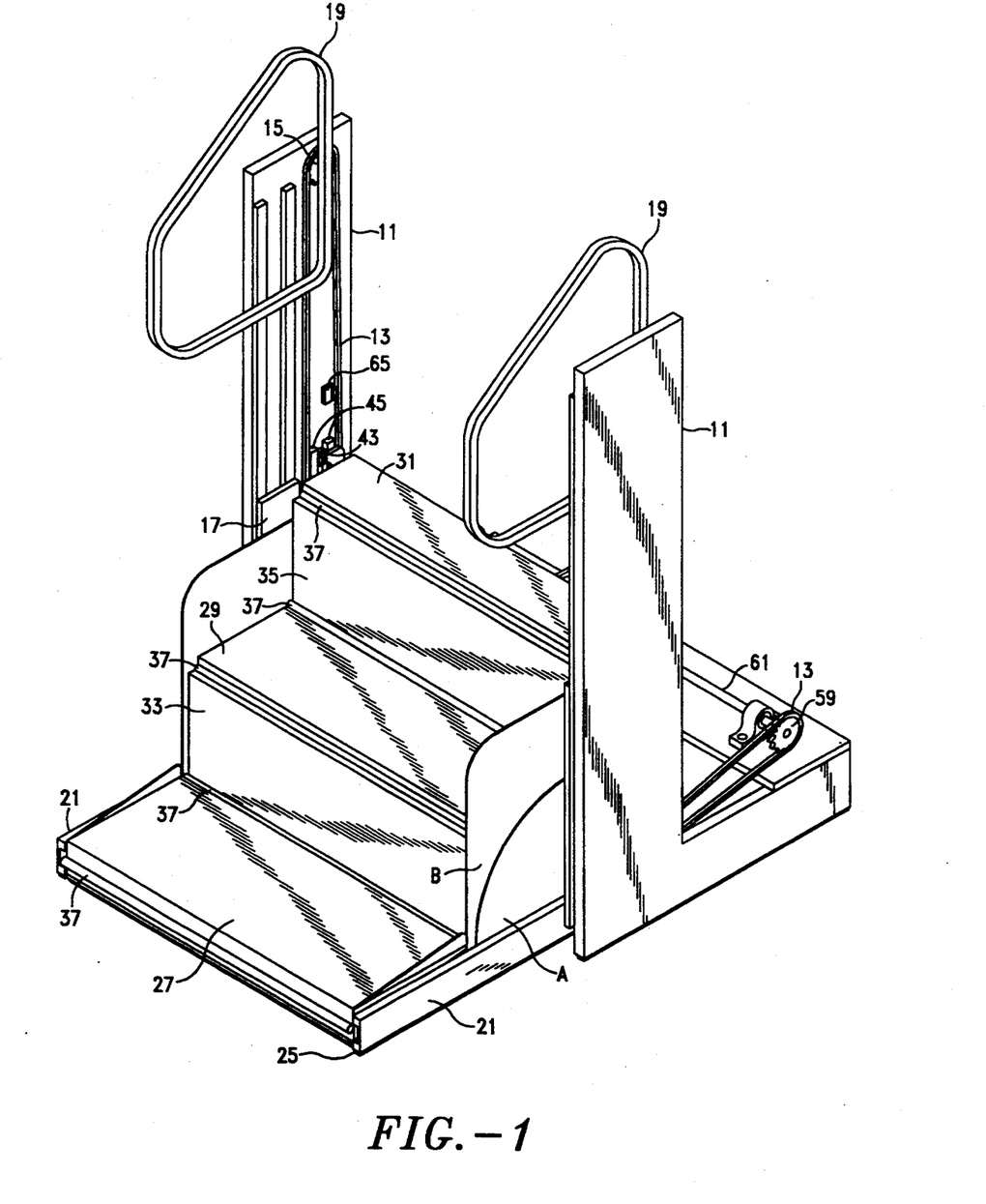
FIG. 1 is a perspective view of the assembled combination folding stair and platform wheelchair lift.
Figure 2:
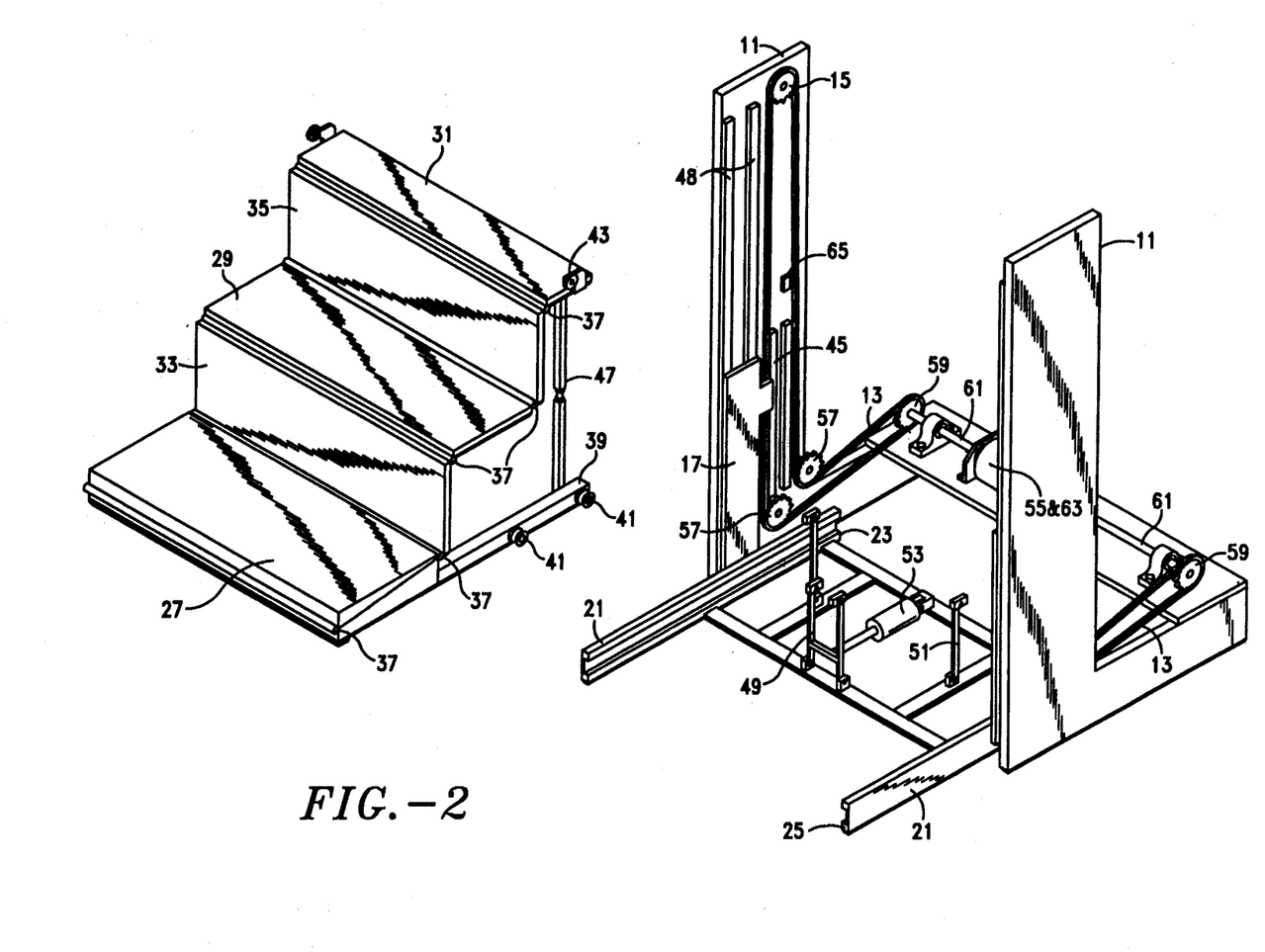
FIG. 2 is an exploded view of FIG. 1 with the side barriers deleted.
Figure 3:
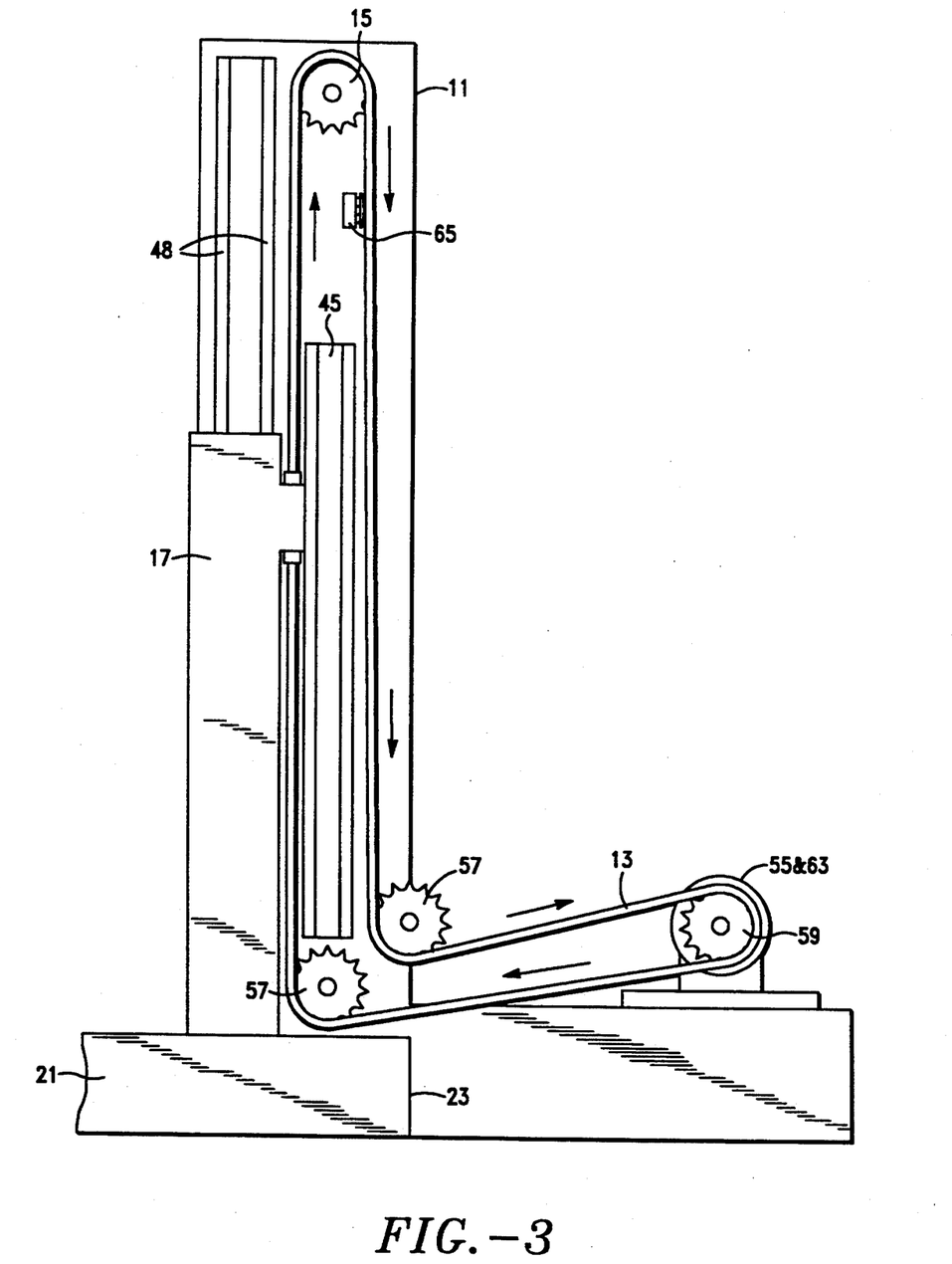
FIG. 3 is a partial broken out section showing the column frames in side elevation with an endless chain drive for the elevator.
Figure 4:
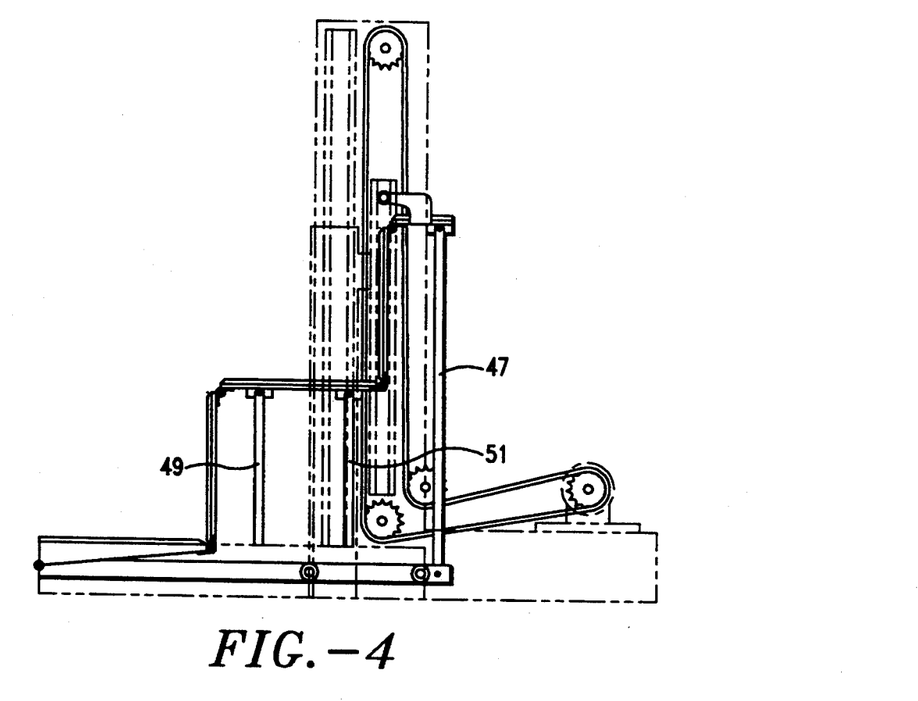
FIG. 4 is a side elevation schematic showing the stair panel array relative to the column frames.
Figure 5:
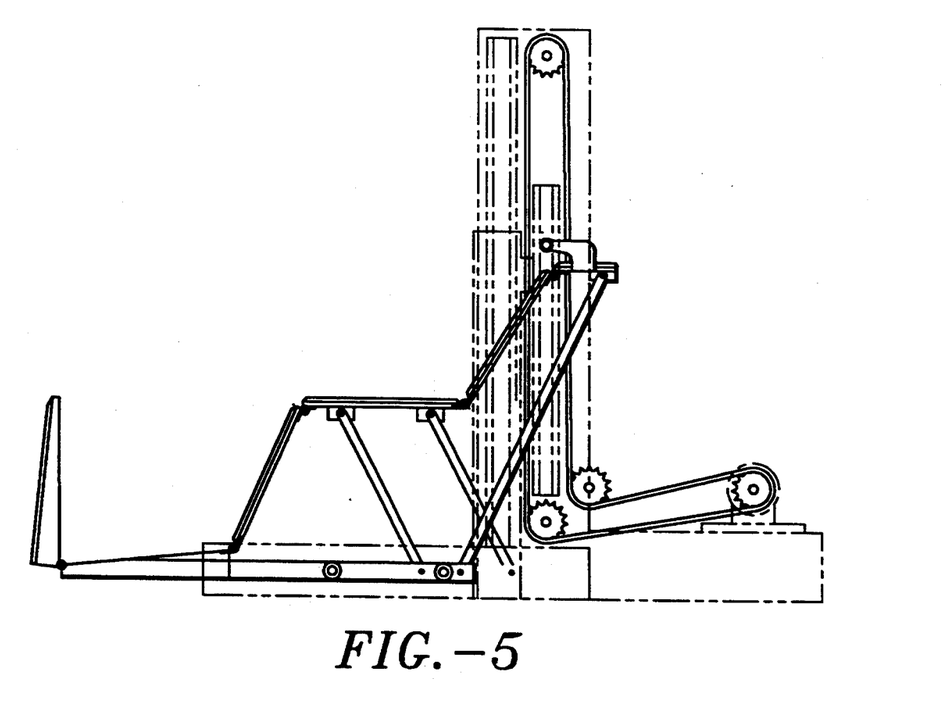
FIG. 5 is a side elevation schematic of FIG. 4 with the stair panel array partially transformed into the lift platform.
Figure 6:
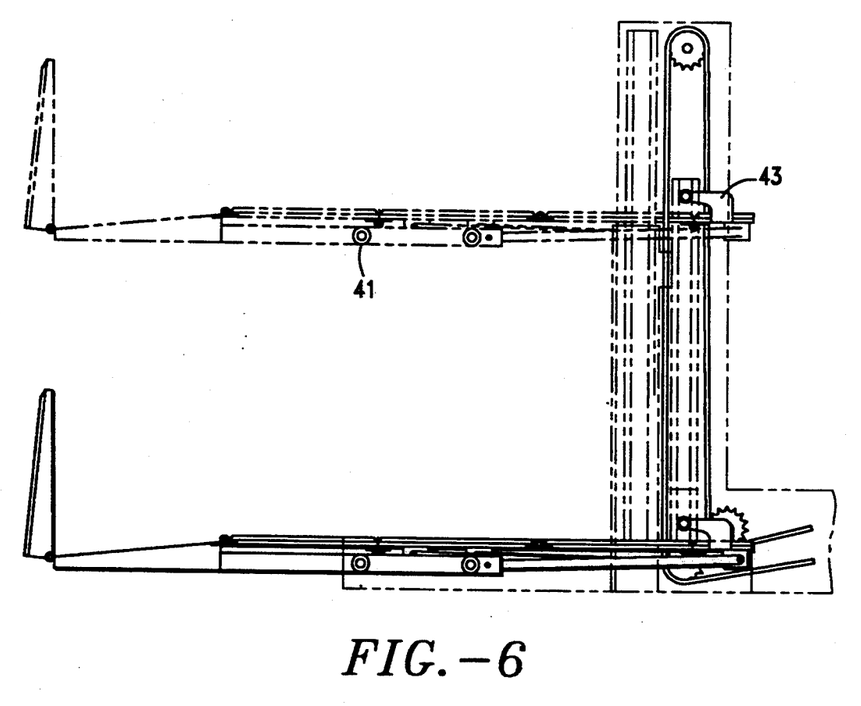
FIG. 6 is a side elevation schematic of FIG. 4 with the panel array in platform configuration (solid lines) and lifted position (dotted lines).

The endless chains 13 are routed over the idler sprockets 15 at the top of the column frames 11 and around direction changing sprockets 57 at the bottom of the columns whereby the chain drives can be routed out to a removed position on the first framework for the drive motor mounting. The chains are driven by sprockets 59 at the ends of a pair of shafts 61 which are interlocked and driven by the same motor 55. This arrangement effects exact coordination between the drive chains.

The drive means for reciprocating the second support arms 49, 51 to change the configuration of the panel array is a hydraulic cylinder 53, and so a hydraulic motor drive 55 for the hoist means permits a hydraulic manifold to activate and operate the two power means from an integrated control mechanism.

The invention also includes a spring brake 63 on the hoist means that is hydraulically controlled to release when pressure is available during either raise or lower functions of the hoist means. It springs back to the brake condition either during normal functioning of the brake in the lift function when pressure is removed from the drive system, or in the case of either electrical or hydraulic failure.

The invention also includes a chain tension sensor 65 in the column frame 11 that senses a load on the platform configuration of the lift and inactivates a switch to inactivate the hydraulic system and prevents the conversion of the panels to steps configuration until the load is removed.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A combination folding stair and platform wheelchair lift which translates from one configuration to the other depending upon the purpose to be served, comprising a pair of vertically disposed parallel column frames secured to a first framework which is secured to the structure in which the wheelchair lift is mounted, a pair of horizontally disposed parallel platform support rails having inboard and outboard ends, and interconnected by a second framework, each of said rails having a slide which is slidably engaged with one of said column frames and which reciprocates vertically with respect thereto, a multiple of interconnected folding panels forming alternately a platform or a series of steps having a lower, intermediate, and top step with risers disposed therebetween, said folding panels interconnected by horizontal, parallel axis, hinges and mounted in a moveable carriage frame having a pair of wheels secured thereto on opposite sides thereof and which ride on tracks mounted on said platform support rails, said top step panel having guide means secured thereto which reciprocate in guide tracks disposed in said column frames as said panels articulate between steps and platform configurations, a pair of first support arms pivoted at their lower ends to said platform support rails and pivoted at their upper ends to said top step panel whereby said panel is disposed horizontal when said panel is arranged in either step or platform configuration, two pairs of second support arms pivoted at their lower ends to said framework and pivoted at their upper ends to said folding panel forming the intermediate step of said folding stair configuration of said array, said support arms forming two sides of a four-bar linkage whereby when said panel is in either the platform or step configuration said panel is disposed horizontally, drive means for reciprocating said second support arms between the horizontal and vertical positions which changes the configuration of said folding panels between the platform and steps configuration, respectively, and hoist means for raising and lowering said slides when said panels are disposed on said support rails in the platform configuration.

2. The combination folding stair and platform wheelchair lift of claim 1 wherein said hoist means includes a pair of endless drive chains mounted in said column frames and secured to said slides respectively, said drive chains being driven by a hydraulic motor.

3. The combination folding stair and platform wheelchair lift of claim 1 wherein said hydraulic motor is mounted on said first framework and drives said pair of endless chain drives simultaneously.

4. The combination folding stair and platform wheelchair lift of claim 1 wherein said drive means includes a hydraulic cylinder secured between said framework and one pair of said second support arms.

5. The combination folding stair and platform wheelchair lift of claim 1 including a spring brake integral to said hoist means that is hydraulically controlled to release during raise or lower functions of the hoist means and to spring back to its brake condition either during normal functioning of the brake in the lift system or in the case of either an electrical or hydraulic failure.

6. The combination folding stair and platform wheelchair lift of claim 1 including a chain tension sensor that senses a load on the platform configuration of the rift and will not allow the conversion to steps configuration until the load is removed.

7. A combination folding stair and platform wheelchair lift which translates from one configuration to the other depending upon the purpose to be served, comprising a pair of vertically disposed parallel column frames secured to a first framework which is secured to the structure in which the wheelchair lift is mounted, a pair of horizontally disposed parallel platform support rails having inboard and outboard ends, and interconnected by a second framework, each of said rails having a slide which is slidably engaged with one of said column frames and which reciprocates vertically with respect thereto, a multiple of interconnected folding panels forming alternately a platform or a series of steps having a lower, intermediate, and top step with risers disposed therebetween, said folding panels interconnected by horizontal, parallel axles, hinges and mounted in a moveable carriage frame having a pair of wheels secured thereto on opposite sides thereof and which ride on tracks mounted on said platform support rails, said top step panel having guide means secured thereto which reciprocate in guide tracks disposed in said column frames as said panels articulate between steps and platform configurations, a pair of first support arms pivoted at their lower ends to said platform support rails and pivoted at their upper ends to said top step panel whereby said panel is disposed horizontal when said panel is arranged in either step or platform configuration, two pairs of second support arms pivoted at their lower ends to said framework and pivoted at their upper ends to said folding panel forming the intermediate step of said folding stair configuration of said array, said support arms forming two sides of a four-bar linkage whereby when said panel is in either the platform or step configuration said panel is disposed horizontally, drive means for reciprocating said second support arms between the horizontal and vertical positions which changes the configuration of said folding panels between the platform and steps configuration, respectively, said drive means including a hydraulic cylinder secured between said framework and one pair of said second support arms, hoist means for raising and lowering said slides when said panels are disposed on said support rails in the platform configuration, said hoist means including a pair of endless drive chains mounted in said column frames and secured to said slides respectively, said drive chains being driven by a hydraulic motor mounted on said first framework and driving said pair of endless chain drives simultaneously, a spring brake integral to said hoist means which is hydraulically controlled to release during raise or lower functions of the hoist means and to spring back to its brake condition either during normal functioning of the brake in the lift system or in the case of either an electrical or hydraulic failure, and a chain tension sensor that senses a load on the platform configuration of the lift and prevents the conversion to steps configuration until the load is removed.

* * * * *